United States Patent [19]

Chasen

[11] Patent Number: 4,592,140
[45] Date of Patent: Jun. 3, 1986

[54] COMBINATION FOOD PEELER AND SLICER

[75] Inventor: Lee R. Chasen, Port Chester, N.Y.

[73] Assignee: Coats & Clark, Inc., Stamford, Conn.

[21] Appl. No.: 703,939

[22] Filed: Feb. 21, 1985

[51] Int. Cl.$^4$ .............................................. B26B 11/00
[52] U.S. Cl. ..................................... 30/123.7; 30/162; 30/279 R
[58] Field of Search ................. 30/123.5, 123.6, 123.7, 30/162, 279 R, 304; 7/118

[56] References Cited

U.S. PATENT DOCUMENTS

| | | | |
|---|---|---|---|
| 472,104 | 4/1892 | Bultzingslowen | 7/118 X |
| 2,182,710 | 12/1939 | Tamke | 30/123.7 UX |
| 2,232,941 | 2/1941 | Fender | 30/279 R |

Primary Examiner—Douglas D. Watts
Attorney, Agent, or Firm—Burgess, Ryan & Wayne

[57] ABSTRACT

A combination food peeler and slicer having parallel peeler and slicer blades. The peeler blade is rotatably mounted in the handle so that it can rock through a limited angular range. The slicer blade is slidably mounted for movement into and out of the handle. The locking arrangement prevents rotation of the peeler blade when the slicer blade is slid out of the handle, and orients the peeler blade so that two convex surfaces of the peeler blade are parallel to the slicer blade, to serve as a spacer during slicing. The rear end of the slicer blade has a latching arrangement for retaining most of the slicer blade within the handle when the device is used as a peeler.

11 Claims, 12 Drawing Figures

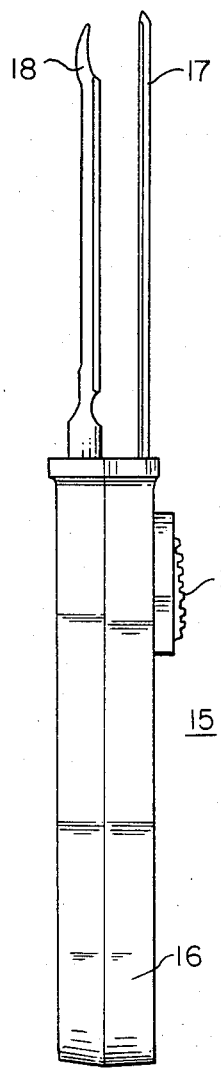
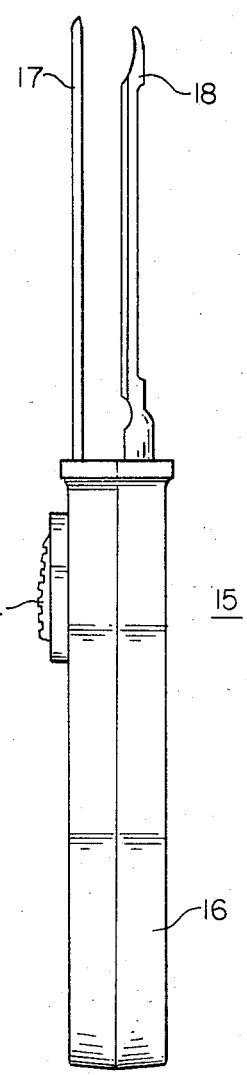
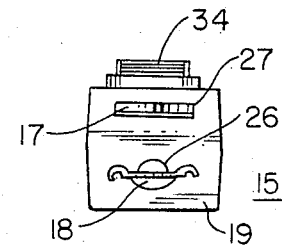
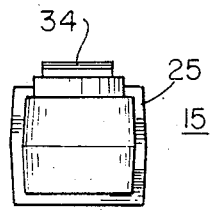
FIG. 4   FIG. 5
FIG. 6
FIG. 7
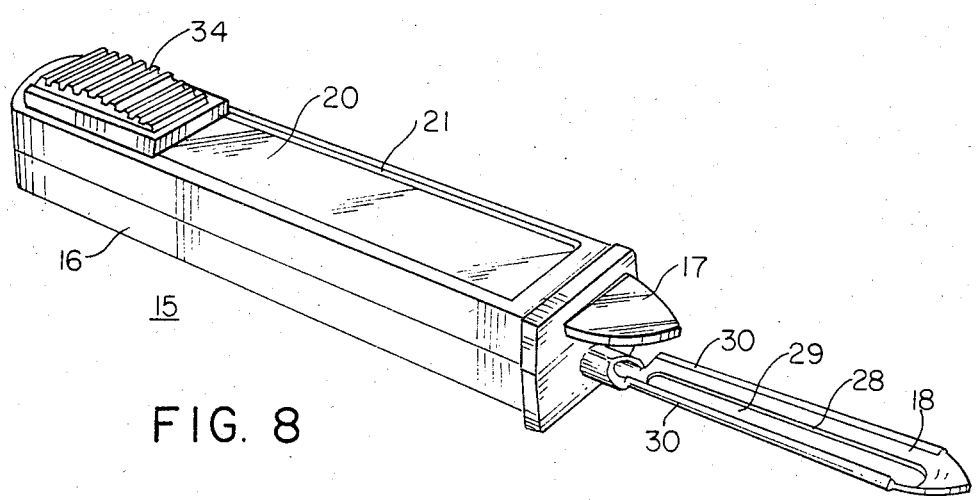
FIG. 8

4,592,140

COMBINATION FOOD PEELER AND SLICER

BACKGROUND OF THE INVENTION

This invention relates to a food preparation tool, and more particularly, to a combination food peeler and slicer.

Food preparation peelers for removing skins from vegetables and other foods are known in the art, as are tools which combine peelers with knife blades for slicing or paring purposes. Such tools are exemplified by the following references:

U.S. Pat. No. 1,440,675—Combination parer and slicer
U.S. Pat. No. 2,614,324—Carrot cutter
U.S. Pat. No. 2,041,596—Combination peeler and slicing knife
U.S. Pat. No. 3,956,825—Rotating blade
U.S. Pat. No. 3,591,923—Vegetable peeler
U.S. Pat. No. 3,169,316—Peeler with resilient blade
U.S. Pat. No. 293,940—Parer, corer and slicer None of the aforementioned references, however, provides a slicer and peeler in a single unit without compromise of the separate slicing and peeling functions.

Accordingly, an object of the present invention is to provide an improved combination food peeler and slicer.

SUMMARY OF THE INVENTION

As herein described, there is provided a combination food peeler and slicer, comprising a handle having a forward end and a rearward end; a peeler element having (i) a peeler blade disposed outside said handle adjacent the forward end thereof and (ii) a peeler stem extending into said handle; peeler stem retaining means operatively associated with said peeler stem and said handle for retaining said stem within said handle while permitting rotation of said stem about the longitudinal axis thereof through a predetermined limited angular range; a slicer blade having a forward slicing part and a rear part; slicer blade retaining means operatively associated with said slicer blade and said handle for retaining the rear part of said slicer blade in said handle while permitting sliding movement of said slicer blade in said handle with at least a portion of said forward slicing part of said slicer blade extending outside said handle adjacent the forward end thereof and substantially parallel to said peeler blade; and peeler stem locking means for preventing rotation of said peeler stem about the longitudinal axis thereof when the forward slicing part of the slicer blade is outside said handle and the rear part of the slicer blade is adjacent the forward end of the handle.

IN THE DRAWING

Figure 9:
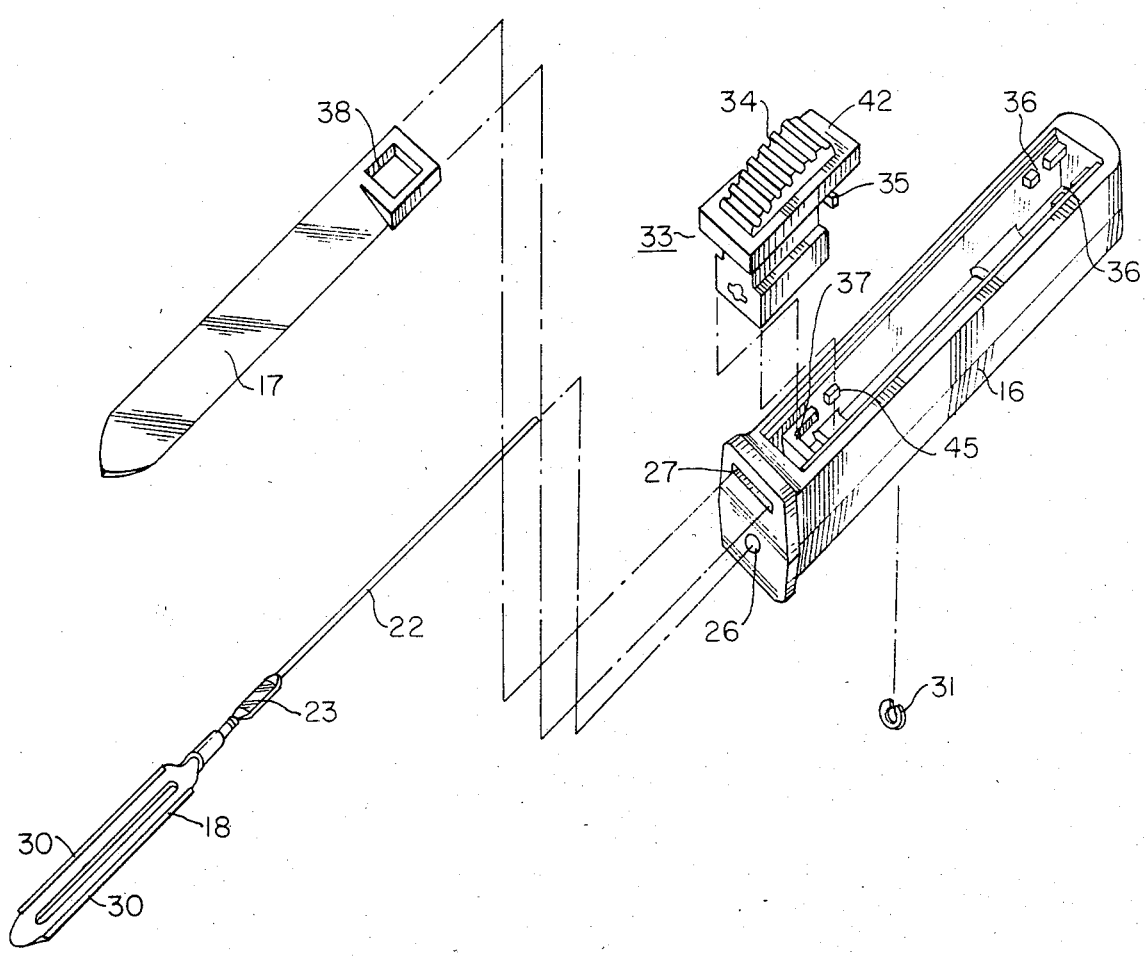
Figure 2:
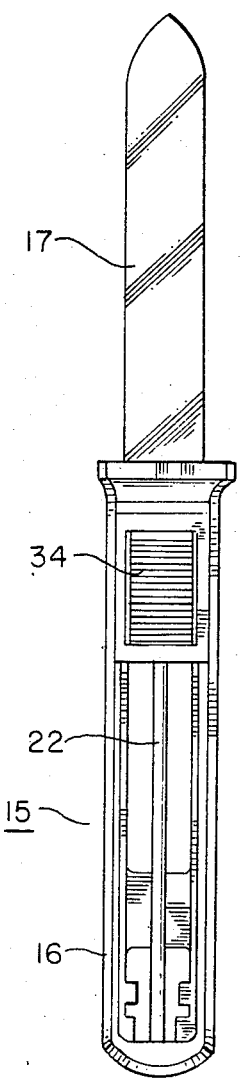
FIG. 2 is a top plan view of the combination peeler and slicer shown in FIG. 1.
Figure 3:
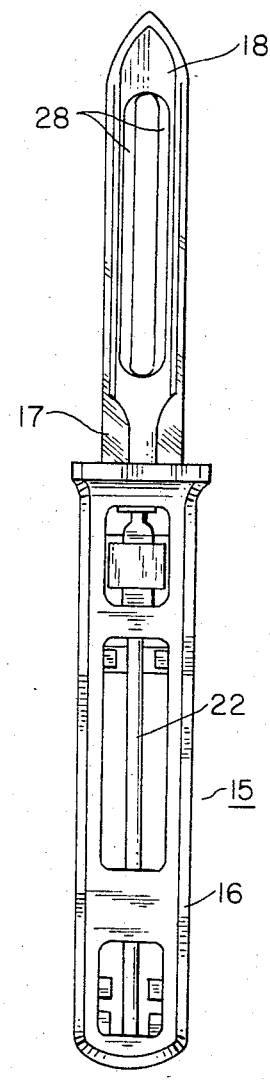
Figure 10:
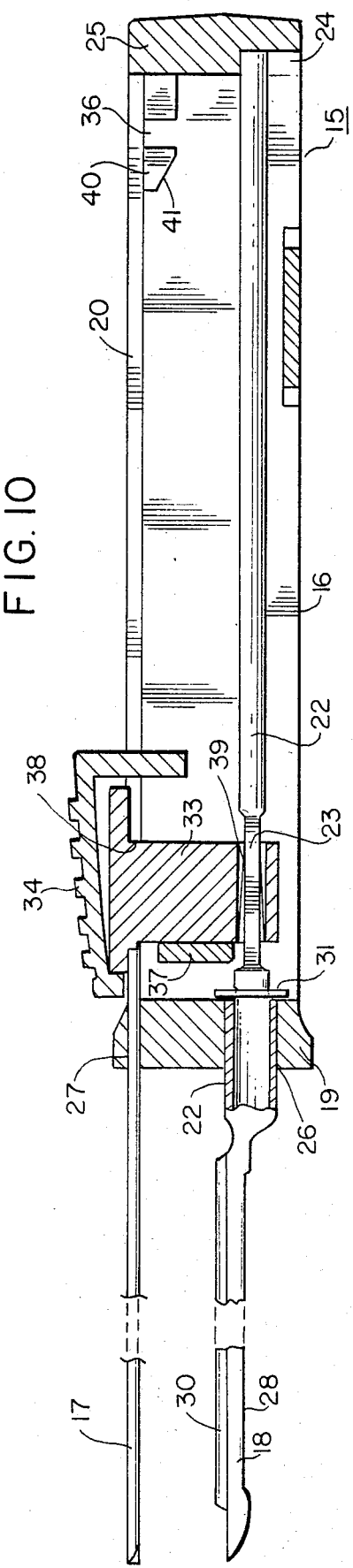
Figure 12:
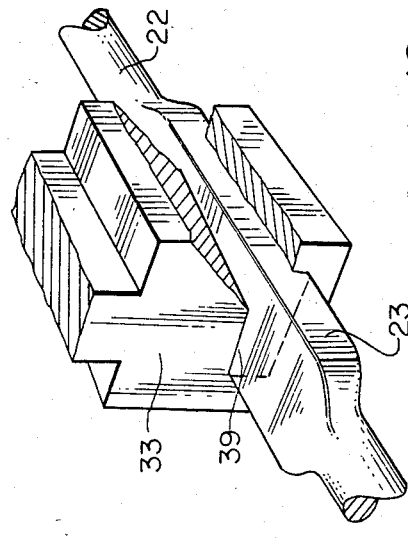
Figure 11:
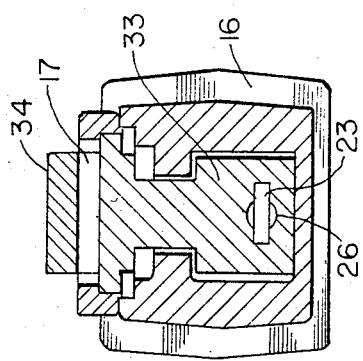

FIG. 3 is a bottom plan view thereof;
FIG. 4 is a front elevation view thereof;
FIG. 5 is a rear elevation view thereof;
FIG. 6 is a left side elevation view thereof;
FIG. 7 is a right side elevation view thereof;
FIG. 8 is a perspective view of said combination food peeler and slicer, with the slicer blade retracted and the peeler element free to rotate within a limited angular range;

FIG. 9 is a exploded perspective view of said combination food peeler and slicer;

FIG. 10 is a front elevation cross-sectional view thereof;

FIG. 11 is a left side elevation cross-sectional view taken through the mechanism which latches the slicer blade in its retracted position, and which locks the peeler element against rotation when the slicer blade is extended; and FIG. 12 is a partially cut away perspective view showing the interaction of said mechanism with a flat on the peeler element stem.

DETAILED DESCRIPTION OF THE PREFERRED EMBODIMENT

Figure 1:
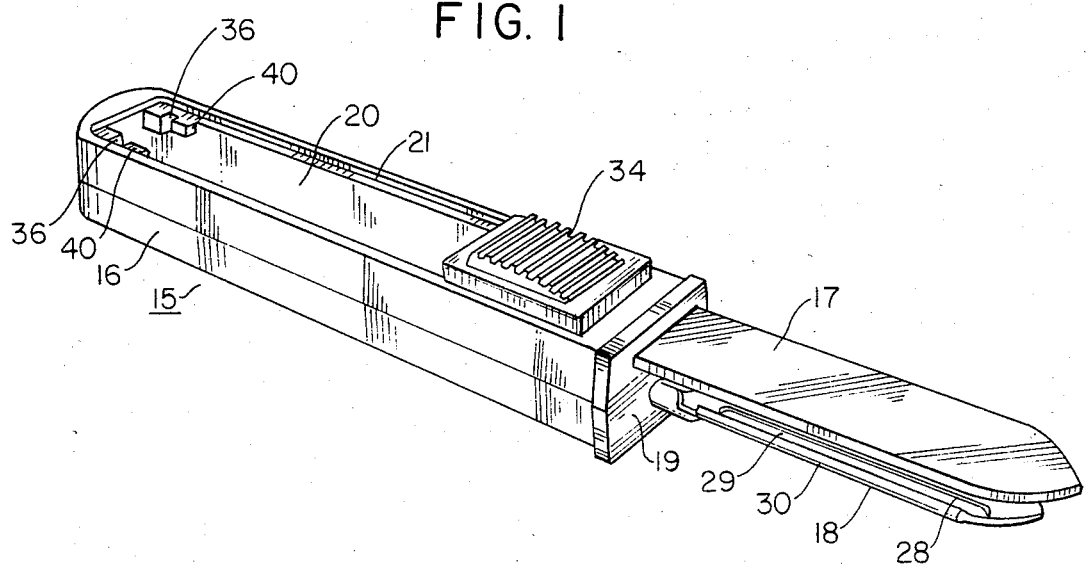
FIG. 1 is a perspective view of a combination food peeler and slicer according to a preferred embodiment of the invention, with the slicer blade extended and the peeler element locked against rotation, for slicer use.

As seen in FIG. 1, the combination food peeler and slicer 15 has a substantially hollow plastic handle 16. A steel slicer blade 17 and a steel peeler element 18 extend from the forward end 19 of the handle 16.

The open upper portion of the interior of the handle 16 comprises a shallow recess 20 having left and right shoulders 21 constituting a guide channel for receiving the slicer blade 17 when it is retracted.

The lower portion of the interior of the handle 16 receives the stem 22 of the peeler element 18. The peeler stem 22 has a flat portion 23 adjacent the front or forward end 19 of the casing 16.

The rear end of the peeler stem 22 is retained in position by an inverted keyhole-shaped recess 24 in the rear end 25 of the handle 16. The front end 19 of the handle 16 has a peeler stem receiving hole 26 through which the forward end of the peeler stem 22 extends.

The forward end 19 of the handle 16 also has a slot 27 through which the cutting portion of the slicer blade 17 extends.

The peeler element 18 has a peeler blade 28 in the form of two sharpened edges on opposite sides of the longitudinal slit 29. On the side of the peeler element 18 facing the slicer blade 17, the peeler element has two coplanar convex spacer surfaces 30 which provide smooth non-jamming guides to limit the thickness of slices cut with the slicer blade 17, without catching against the sides of the slices.

The peeler stem 22 is prevented from being pulled out of the front end 19 of the handle 16, by the C-clip 31, which engages an annular groove in the forward portion of the stem 22, leaving the stem 22 free to rotate within the front and rear ends 19 and 25 of the handle 16.

A plastic control mechanism 33 is slidably mounted for movement along the slicer blade guide channel comprising the recess 20 and peripheral ledge 21. The control mechanism 33 has a resiliently mounted thumb operating or actuating portion 34, the rearward end of which has laterally spaced upwardly extending prongs 35 (FIG. 9) adapted to engage corresponding recesses 36 formed in widened rearward portions 40 of the ledge 21, to retain the control mechanism 33 and the slicer blade 17 attached thereto, in retracted position.

A protuberance 37 affixed to the inner wall of the front end 19 of the handle 16 adjacent the forward portion of the control mechanism (FIGS. 9 and 10) 33 limits the forward travel of said mechanism when the control mechanism 33 is adjacent the front end 19 of the handle 16. The protuberance 37 also serves to limit the rotation of the flat portion 23 of the stem 22 of the peeler element 18 to a relatively small angular range, by abutment of the upper edges of the flat portion 23 against the lower edge of the protuberance 37.

The rear portion of the slicer blade 17 has a square or rectangular hole 38 (FIG. 9) through which the lower portion of the body of the control mechanism 33 extends, to retain the slicer blade 17 in position.

The lower portion of the control mechanism 33 has a longitudinal slit 39, the upper and lower surfaces of said slit comprising wedge-shaped resilient material to form a wedge opening toward the front end 19 of the handle 16, with the stem 22 of the peeler element 18 extending through the slit 39, so that the control mechanism 33 is slidably movable along the stem 22.

When the control mechanism 33 is in the forward position near the front end 19 of the handle 16, as best shown in FIG. 10, the parallel portions of the upper and lower surfaces of the wedge-shaped slot 39 engage the flat portion 23 of the otherwise cylindrical stem 22, to prevent rotation of the peeler element 18 and to lock the peeler element 18 in a position such that the convex surfaces 30 lie in a plane parallel to the slicer blade 17, to provide the desired slicer control effect, without jamming. As best seen in FIGS. 10-12, the wedge-shaped slot entrance serves to initially align the flat portion 23 in the desired position in which it is to be held by the parallel portions of the slot 39.

In the forward position of the control mechanism 33, the prongs 35 are disposed forward of and are restrained from rearward movement by engagement with corresponding housing tabs 45 on the inner wall of the handle 15.

When use of the slicer blade 17 is not required, the thumb operating portion 34 is pressed (i) down to release the prongs 35 from the housing tabs 45, and (ii) toward the rear end 25 of the handle 16, to move the control mechanism 33 backward, and thereby retract the slicer blade 17.

When the control mechanism 33 has been moved back to a position near the rear end 25 of the handle 16, the thumb operating portion 34 thereof is depressed to move the prongs 35 downward (further into the handle 16) so as to enable them to clear the forward widened portions 40 of the ledge 21, so as to engage the recesses 36. Alternatively, if the thumb element 34 is not depressed, the inclined planes 41 (FIG. 10) on the ledge portions 40 will engage the prongs 35 to urge them downward so as to automatically provide the desired latching action of the prongs 35 in the recesses 36.

When it is desired to utilize the retracted slicer blade 17, the thumb element 34 is depressed to move the prongs 35 downward so that they clear the recesses 36, enabling the control mechanism 33 and slicer blade 17 to be slid forward.

The combination food peeler and slicer described above has relatively few piece parts, and provides a peeler which is free to swivel within a limited (by protuberance 37 and flat 23) angular range for conventional peeling purposes; as well as a slicer which, when in use, cooperates with the convex curved surfaces 30 of the peeler element 18, to provide a spacing action in cooperation with the peeler element, which element is locked against rotation when the slicer blade is in use. The wedging action of the slot 39 insures that the flat portion 23 and therefore the parallel surfaces 30, are locked in a position parallel to the major surfaces of the slicer blade 17.

What is claimed is:

1. A combination food peeler and slicer, comprising:
   a substantially hollow handle having a peeler stem receiving portion and a slicer blade guide channel communicating with said peeler stem receiving portion;
   said handle having a forward end and a rearward end, said forward end having a peeler stem receiving hole communicating with said peeler stem receiving portion and a slicer blade receiving slot communicating with said slicer blade guide channel;
   a peeler element having (i) a peeler blade disposed outside said handle adjacent the forward end thereof, and (ii) a peeler stem extending into said peeler stem receiving portion of said handle through said peeler stem receiving hole;
   peeler stem retaining means operatively associated with said peeler stem and said handle for retaining said stem within said handle while permitting rotation of said stem about the longitudinal axis thereof through a predetermined limited angular range;
   a slicer blade having a forward slicing part and a rear part;
   slicer blade retaining means operatively associated with said slicer blade and said slicer blade guide channel for retaining the rear part of said slicer blade in said guide channel while permitting sliding movement of said slicer blade in said guide channel with at least a portion of said forward slicing part of said slicer blade extending through said slicer blade receiving slot outside said handle adjacent the forward end thereof and substantially parallel to said peeler blade;
   slicer blade latching means operatively associated with the rear part of said slicer blade and said handle for detachably securing the rear part of the slicer blade adjacent the rearward end of the handle; and
   peeler stem locking means for preventing rotation of said peeler stem about the longitudinal axis thereof only when the forward slicing part of the slicer blade is outside said handle and the rear part of the slicer blade is adjacent the forward end of the handle.

2. The combination food peeler and slicer according to claim 1, wherein said slicer blade retaining means comprises a guide element secured to the rear part of the slicer blade and having a protrusion extending into the peeler stem receiving portion of said handle, with a hole in said protrusion, said peeler stem extending through said hole so that said protrusion is thereby slidably mounted on said stem.

3. The combination food peeler and slicer according to claim 2, wherein said peeler stem locking means comprises a flat on said peeler stem within said peeler stem receiving portion of said handle adjacent the forward end thereof, and a wedging slot in said protrusion for engaging said flat when said protrusion is adjacent the forward end of said handle.

4. The combination food peeler and slicer according to claim 1, wherein said slicer blade latching means comprises:
   at least one locking recess in said handle adjacent the rearward end thereof,
   a locking member mounted on the rear part of the slicer blade and adapted to engage said locking recess, biasing means on the rear part of said slicer blade for urging said locking member toward said locking recess, and an actuating button for moving said locking member against the action of said biasing means, so that upon release of the actuating button the locking member may engage said locking recess.

5. The combination food peeler and slicer according to claim 1, wherein said peeler blade has two longitudinally oriented coplanar convex spacer surfaces parallel to said guide blade, said convex surfaces cooperating with said guide blade to facilitate the cutting of slices.

6. A combination food peeler and slicer, comprising:
a handle having a forward end and a rearward end;
a peeler element having (i) a peeler blade disposed outside said handle adjacent the forward end thereof, and (ii) a peeler stem extending into said handle;
peeler stem retaining means operatively associated with said peeler stem and said handle for retaining said stem within said handle while permitting rotation of said stem about the longitudinal axis thereof through a predetermined limited angular range;
a slicer blade having a forward slicing part and a rear part;
slicer blade retaining means operatively associated with said slicer blade and said handle for retaining the rear part of said slicer blade in said handle while permitting sliding movement of said slicer blade in said handle with at least a portion of said forward slicing part of said slicer blade extending outside said handle adjacent the forward end thereof and substantially parallel to said peeler blade;
slicer blade latching means operatively associated with the rear part of said slicer blade and said handle for detachably securing the rear part of the slicer blade adjacent the rearward end of the handle; and
peeler stem locking means for preventing rotation of said peeler stem about the longitudinal axis thereof only when the forward slicing part of the slicer blade is outside said handle and the rear part of the slicer blade is adjacent the forward end of the handle.

7. The combination food peeler and slicer according to claim 6, wherein said locking means includes orienting means for positioning said slicer blade so that predetermined surface portions thereof are parallel to the slicer blade.

8. A combination food peeler and slicer, comprising:
a handle having a forward end and a rearward end;
a peeler element having (i) a peeler blade disposed outside said handle adjacent the forward end thereof, said peeler blade having two coplanar convex surface portions, and (ii) a peeler stem extending into said handle;
peeler stem retaining means operatively associated with said peeler stem and said handle for retaining said stem within said handle while permitting rotation of said stem about the longitudinal axis thereof through a predetermined limited angular range;
a slicer blade having a forward slicing part and a rear part;
slicer blade retaining means operatively associated with said slicer blade and said handle for retaining the rear part of said slicer blade in said handle while permitting sliding movement of said slicer blade in said handle with at least a portion of said forward slicing part of said slicer blade extending outside said handle adjacent the forward end thereof and substantially parallel to said peeler blade; and peeler stem locking means for (i) positioning said peeler stem so that the convex surface portions of the peeler blade are substantially parallel to the forward slicing part of said slicer blade, and for (ii) preventing rotation of said peeler stem about the longitudinal axis thereof only when the forward slicing part of the slicer blade is outside said handle and the rear part of the slicer blade is adjacent the forward end of the handle.

9. A combination food peeler and slicer, comprising:
a handle having a forward end and a rearward end;
a peeler element having (i) a peeler blade disposed outside said handle adjacent the forward end thereof and (ii) a peeler stem extending into said handle;
peeler stem retaining means operatively associated with said peeler stem and said handle for retaining said stem within said handle while permitting rotation of said stem about the longitudinal axis thereof through a predetermined limited angular range;
a slicer blade having a forward slicing part and a rear part;
slicer blade retaining means operatively associated with said slicer blade and said handle for retaining the rear part of said slicer blade in said handle while permitting sliding movement of said slicer blade in said handle with at least a portion of said forward slicing part of said slicer blade extending outside said handle adjacent the forward end thereof and substantially parallel to said peeler blade; and
peeler stem locking means for preventing rotation of said peeler stem about the longitudinal axis thereof only when the forward slicing part of the slicer blade is outside said handle and the rear part of the slicer blade is adjacent the forward end of the handle.

10. A combination food peeler and slicer, comprising:
a handle having a peeler stem receiving portion and a slicer blade guide portion;
said handle having a forward end and a rearward end, said forward end having a peeler stem receiving hole communicating with said peeler stem receiving portion and a slicer blade receiving hole communicating with said slicer blade guide portion;
a peeler element having (i) a peeler blade disposed outside said handle adjacent the forward end thereof, and (ii) a peeler stem extending into said peeler stem receiving portion of said handle through said peeler stem receiving hole;
peeler stem receiving means operatively associated with said peeler stem and said handle for retaining said stem within said handle while permitting rotation of said stem about the longitudinal axis thereof through a predetermined limited angular range;
a slicer blade having a forward slicing part and a rear part;
slicer blade retaining means for retaining the rear part of said slicer blade in said slicer blade guide portion while permitting sliding movement of said slicer blade in said slicer blade guide portion with at least a portion of said forward slicing part of said slicer blade extending through said slicer blade receiving hole outside said handle adjacent the forward end thereof; and peeler stem locking means for preventing rotation of said peeler stem about the longitudinal axis thereof only when the forward slicing part of the slicer blade is outside said handle and the rear part of the slicer blade is adjacent the forward end of the handle.

11. The combination food peeler and slicer according to claim 10, further comprising slicer blade latching means operatively associated with the rear part of said slicer blade and said handle for detachably securing the rear part of the slicer blade adjacent the rearward end of the handle.

* * * * *